Feb. 6, 1934.   A. D. EVANS ET AL   1,946,458
CONVEYING MECHANISM
Filed Jan. 28, 1933   2 Sheets-Sheet 2

INVENTORS
ARCHIBALD D. EVANS
HAROLD H. CLARK
By Paul Paul Moore
ATTORNEYS

Patented Feb. 6, 1934

1,946,458

UNITED STATES PATENT OFFICE 1,946,458

CONVEYING MECHANISM

Archibald D. Evans, Warren, Ohio, and Harold H. Clark, Ellwood City, Pa.; said Clark assignor to Mathews Conveyer Company, Ellwood City, Pa., a corporation of Pennsylvania, and said Evans assignor to The Wean Engineering Company, Inc., Warren, Ohio, a corporation of Ohio Application January 28, 1933. Serial No. 654,032

3 Claims. (Cl. 198—127)

This invention relates to new and useful improvements in conveying mechanisms, and more particularly to conveyors or runout tables of the herringbone type, such as disclosed in the co-pending application of Martin J. Anderson, filed December 28, 1932, Serial No. 649,202, patented Oct. 17, 1933, No. 1,931,454.

The conveying mechanism herein disclosed, is particularly adapted for transporting metal bars, sheets, and packs of sheets, from the discharge ends of a plurality of heating furnaces to a receiving means such, for example, as a feeder table leading to a single rolling mill, and when thus used, it is interposed between the heating furnaces and the rolling mill feeder table. The mechanism may also be used for transferring various other articles, such as packages, boxes, crates, and the like, from a plurality of sources of supply to a single receiving means, and it may be power driven in a manner similar to the structure disclosed in the above mentioned pending application, or, if conditions permit, it may be of the gravity type.

In a conveying mechanism comprising a plurality of rows of rollers disposed with the axes of the rollers of adjacent rows at an oblique angle, each row of rollers will tend to convey articles in a path lengthwise of the row, or on a line disposed at approximately right angles or 90° to the axes of the rollers of said row. It is therefore obvious that articles delivered to each row of rollers at their receiving ends, will move inwardly towards the longitudinal centerline of the apparatus or runout table, simultaneously as they advance thereover. As the articles approach the discharge end of the apparatus, the leading inner corners thereof will be supported, in part, by rollers of an adjacent row. In approaching the rollers of the adjacent row, it frequently happens, particularly when transporting such articles as thin hot metal sheets, that the sheets are in a warped condition when discharged from the heating furnaces.

When the adjacent ends of the rollers of adjacent rows are spaced laterally from the longitudinal centerline between rows, or, in other words, if the axes of said rollers do not intersect said longitudinal centerline, the leading edge portions of the hot sheets, if warped or drooping, may impinge against the ends of the rollers of an adjacent row whereby said edge portions may buckle or turn under, which may cause flaws or defects to appear in the finished sheet. It is therefore highly desirable that the apparatus be so constructed that the sheets cannot thus impinge against the ends of the rollers, and whereby the sheets may be advanced smoothly and expeditiously over the apparatus without interruption.

The primary object of this invention, therefore, is to provide an improved runout table or apparatus of the general character herein disclosed, having means for preventing the edges or corners of the sheets, or other articles, from impinging against the ends of the rollers of an adjacent row of rollers, whereby the transferring of sheets or other articles over the apparatus may be expedited.

A further object is to provide a runout table of the herringbone type, having the adjacent ends of certain of the rollers of adjacent rows of rollers, interdigitated or meshed together, and having said meshed together ends tapered or beveled, whereby the edges of the sheets cannot impinge against the ends of said rollers, when portions of the sheets pass from the rollers of one row onto the rollers of an adjacent row, thereby permitting warped sheets, or sheets having drooping corners, to pass with a minimum of resistance from either side of the receive end of the apparatus to the center thereof, as they approach the discharge end of the apparatus.

Other objects of the invention will appear from the following description and accompanying drawings and will be pointed out in the annexed claims.

In the accompanying drawings there has been disclosed an improved construction designed to carry out the various objects of the invention, but it is to be understood that the invention is not confined to the exact features shown, as various changes may be made within the scope of the claims which follow.

Figure 1:
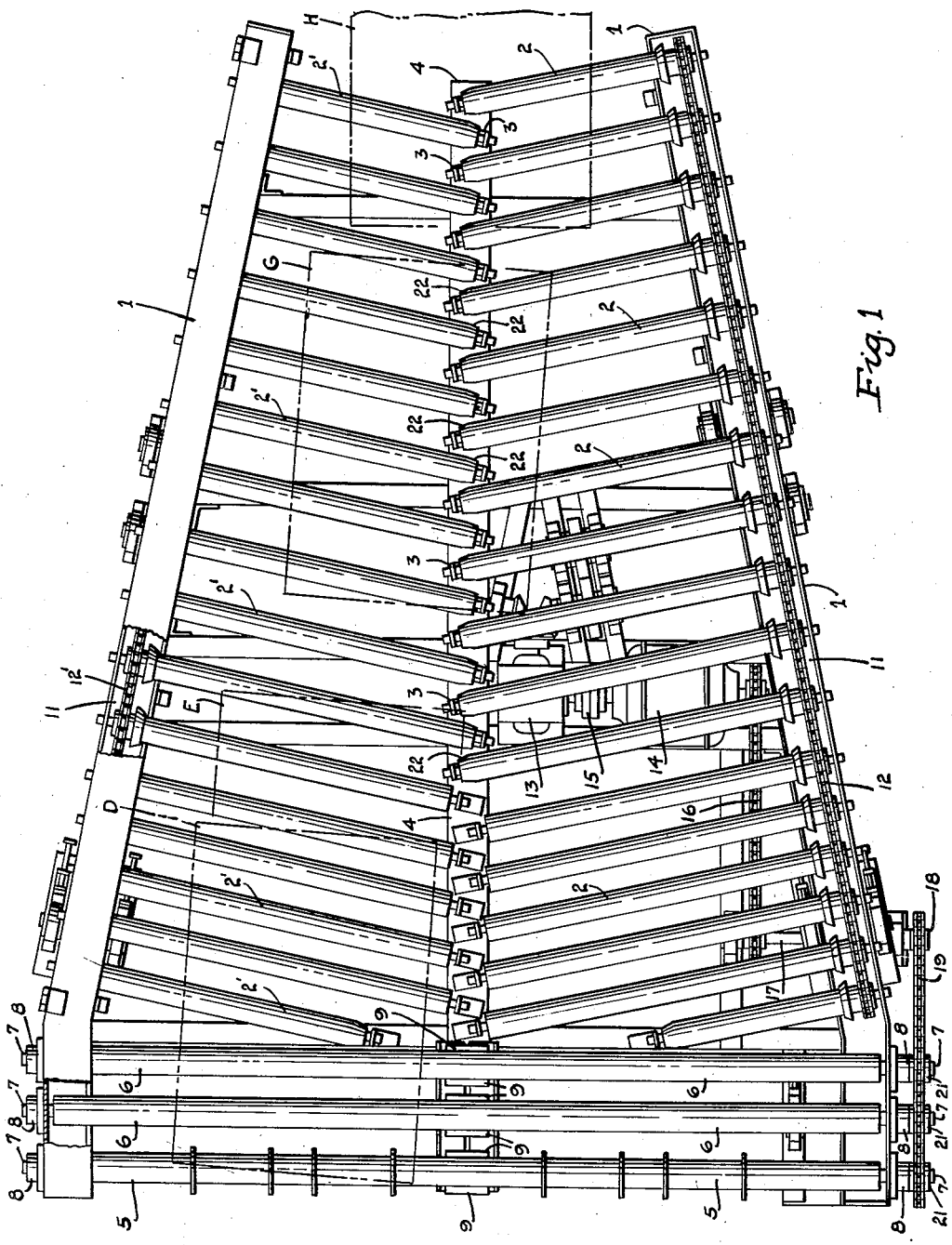
Figure 1 is a plan view of a power driven runout table embodying our improved construction.

In the selected embodiment of the invention here shown, for purposes of disclosure, there is illustrated in Figure 1, a conveying mechanism or runout table of the general character disclosed in the pending application hereinbefore referred to, and as the supporting structure of the present apparatus and the drives for the various rollers thereof are similar to the corresponding parts in said aforementioned application, these parts will be but briefly described herein.

The runout table herein disclosed, is shown comprising a supporting structure including built up side frame members 1, preferably box-shaped in cross section, adapted to receive and rotatably support the outer ends of a plurality of conveyor rollers 2 and 2', arranged in two rows, the rollers 2 constituting one row, and the rollers 2' another row. The inner ends of the rollers of both rows are supported in suitable angle brackets 3 secured to the top surface of a longitudinally disposed center beam 4 of the main supporting structure.

The runout table illustrated in Figure 1 is symmetrical about its longitudinal center line, and the side members 1 converge inwardly from the receive to the discharge end thereof. The load carrying rollers 2 and 2' at each side of the center line of the apparatus are arranged at substantially right angles to their respective side members 1, as shown, whereby the axes of the rollers 2 will be disposed at an oblique angle to the axes of the rollers 2'. By thus arranging the load carrying rollers 2 and 2', articles delivered onto the receive end of the table from separate sources, will be conveyed over the top of the table towards the discharge end thereof and, at the same time, will be conveyed inwardly towards the center of the discharge end of the table, as indicated by the dotted lines D, E, G, and H, which represent different positions assumed by articles as they travel over the rollers 2 and 2', from the receive to the discharge end of the apparatus.

Relatively longer rollers 5 and 6—6 are provided at the receive end of the structure. These rollers are mounted upon and secured to suitable shafts 7 supported in suitable bearings 8 shown secured to the side plates of the supporting members 1—1. The intermediate portions of the rollers 5 and 6—6 are supported upon suitable anti-friction rollers 9 mounted in suitable brackets secured to the center beam 4.

The means for continuously driving or rotating the rollers 2 and 2' and also the relatively longer rollers 5 and 6—6 at the receive end of the apparatus, is partially shown in Figure 1. The rollers 2 and 2' are provided at their outer ends with suitable sprockets located within chambers 11 provided in the side members 1. These sprockets may be driven by suitable chains 12 and 12' operatively connected to a speed reducer 13 by suitable driving connections, not shown. The speed reducer 13 is shown coupled to a motor 14 by a suitable coupling 15.

The relatively longer rollers 5 and 6—6 at the receive end of the table are also driven from the motor 14, and synchronously with the rollers 2 and 2'. To thus operate the rollers 5 and 6—6, a chain drive 16 is shown operatively connecting the opposite end of the shaft of the motor 14 to a counter shaft 17 supported in suitable bearings, and having a sprocket 18 secured to the outer end thereof. The sprocket 18 has a chain 19 operatively connecting it to a similar sprocket 21 secured to the shafts 7 of the rollers 5 and 6—6. It will thus be seen that all of the rollers of the mechanism are operatively connected with the motor 14 whereby, when the latter is operated, the rollers 2 and 2', and 5 and 6—6 will be rotated simultaneously.

When the live roller conveyer mechanism or runout table herein disclosed, is employed for transporting sheets from two furnaces to the receive or feeder table of a rolling mill, it is interposed between the discharge ends of the furnace and the receiving means leading to the rolling mill. During the manufacture of sheet metal, the rollers of the runout table operate continuously, and are at all times in readiness to receive sheets from the furnace and transport them to the rolling mill receive. When a sheet is discharged from a furnace alined with the rollers 2', it is conveyed straight onto said rollers by the power of the driven feed rollers 5 and 6—6, until substantially one-half the weight of the sheet is carried by the rollers 2'. Because of the rollers 2' being disposed at an angle with relation to the rollers 5 and 6—6, when the sheet initially engages the rollers 2' it will assume an angular position, as indicated by the dotted lines D. The sheet will be conveyed in this angular position towards the discharge end of the runout table, as indicated by the dotted line positions E and G, until it engages the rollers 2 at the discharge end of the table, whereupon the sheets will assume the position indicated by the dotted lines H, in which position it will be noted that it is substantially alined with the discharge end of the runout table or the longitudinal centerline thereof.

The sheets are frequently in a warped condition when discharged from the furnace due to the heat and the manner in which the sheets are supported while being transported through the furnace by the furnace conveyer. Such warping of the sheet may result in an edge or a corner thereof drooping downwardly in a manner which would permit said drooping portion to impinge against or catch on the inner ends of the rollers 2, when the sheet is being conveyed over the rollers 2' and reaches the position E, where it will be noted that the forward right hand corner engages the adjacent ends of the rollers 2. Such engagement of the sheets with the ends of the rollers 2 is objectionable, as it may cause buckling and distortion of the sheets before they reach the rolling mill.

Figure 2:
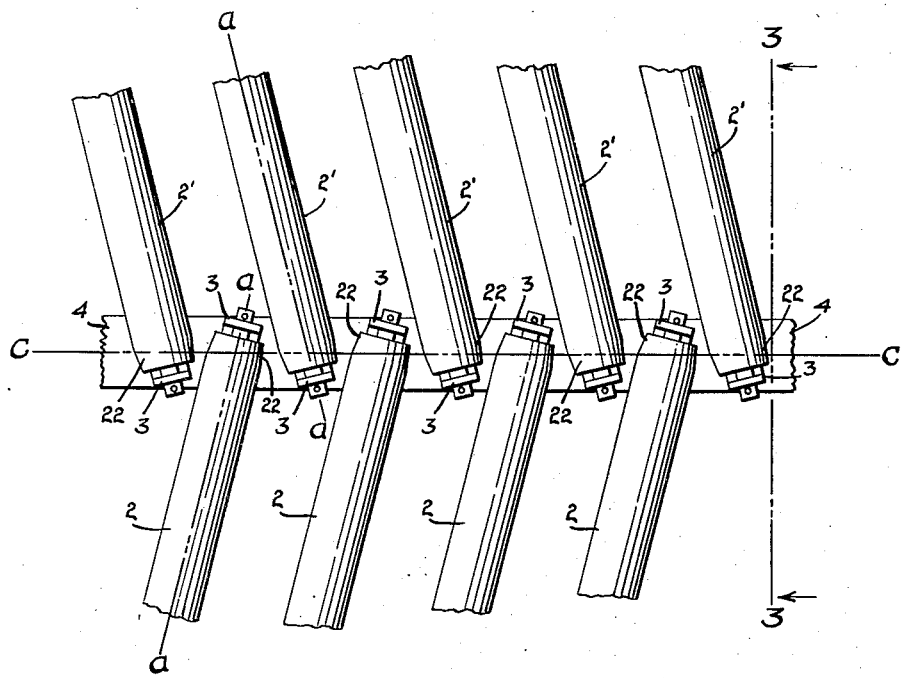
Figure 2 is a partial plan view on an enlarged scale, showing the interlocking arrangement of the ends of adjacent rows of rollers.
Figure 3:
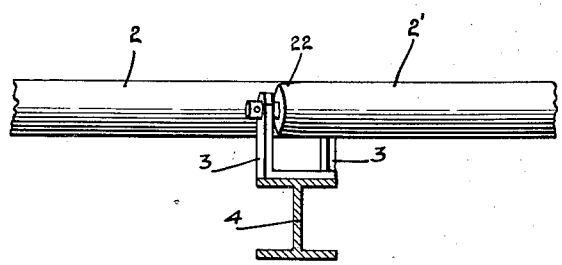
Figure 3 is a detail sectional view on the line 3—3 of Figure 2.

It is therefore desirable that means be provided for positively preventing the leading corners or edges of the sheets from thus engaging against the inner ends of the rollers 2 and 2'. To prevent such interference of the sheets with said rollers, the inner ends of the rollers 2 and 2', towards the discharge end of the runout table, are interdigitated or meshed together, as clearly shown in Figures 1 and 2. By thus interdigitating the adjacent ends of the rollers 2 and 2', the axes $a$ of said rollers will intersect the longitudinal centerline C of the apparatus, as clearly shown in Figure 2, resulting in the adjacent ends of the rollers 2 and 2' being closely spaced together along the centerline C. By thus interlocking the inner ends of the rollers and closely spacing them together, as above described, the forward or leading edge portions of the sheets will be adequately supported by said rollers so that said edge portions cannot sag or droop sufficiently to allow them to engage or impinge against the inner ends of the rollers.

To further prevent the sheets from impinging against the adjacent ends of the rollers 2 and 2', the inner ends of said rollers are tapered or beveled, as indicated at 22, whereby the leading corners or edges of the sheet are substantially positively prevented from impinging against the ends of said rollers.

The interdigitating or meshing together of the inner ends of the rollers, and also the tapering or beveling of the adjacent ends of the two rows of rollers 2 and 2' therefore forms an important part of this invention, as it makes it possible to transport hot thin sheets over the apparatus without danger of the leading edges thereof engaging the inner ends of the rollers, which might result in buckling of the sheet. The rollers are arranged to form substantially a herringbone construction whereby the sheets or articles delivered onto the runout table will be conveyed over the surface thereof without danger of running off at the sides of the table, and the use of side rails or other guide means at the sides of the table is therefore unnecessary.

In the drawings, we have shown a runout table of symmetrical design adapted for transporting hot sheet metal plates from a furnace to a rolling mill, but it is to be understood that the invention is well adapted for use in connection with other types of herringbone conveyers such, for example, as structures which may be unsymmetrical in design, straight power driven conveyers, and gravity converging or frog section conveyers. It may also be used for conveying various kinds of sheets, such as composition sheets, plaster sheets, insulating sheets, etc. and it is also adapted for conveying soft bottom cartons, bundles of articles, and various other merchandise.

We claim as our invention:

1. In a conveying mechanism, a supporting structure comprising diverging side frame members and a longitudinally extending centrally disposed beam, a plurality of load carrying rollers supported in said structure and arranged in two rows, the axes of the rollers of one of said rows being disposed at substantially right angular relation to one of said side frame members, and the axes of the rollers of the other of said rows being disposed at right angular relation to the other of said side frame members, whereby the axes of the rollers of one row will be disposed obliquely to the axes of the rollers of the other of said rows, and the adjacent ends of the rollers of said rows being supported upon said center beam in interdigitating relation, to thereby prevent sagging or drooping portions of articles conveyed by said rollers from impinging against the ends thereof, when passing from the rollers of one row onto the rollers of the other row.

2. In a conveying mechanism, a supporting structure comprising diverging side frame members and a longitudinally extending centrally disposed beam, a plurality of load carrying rollers supported in said structure and arranged in two rows, the axes of the rollers of one of said rows being disposed at substantially right angular relation to one of said side frame members, and the axes of the rollers of the other of said rows being disposed at right angular relation to the other of said side frame members, whereby the axes of the rollers of one row will be disposed obliquely to the axes of the rollers of the other of said rows, and the adjacent ends of the rollers of said rows being supported upon said center beam in interdigitating relation, and the interdigitated end portions of said rollers being beveled whereby said end portions are reduced in diameter to thereby prevent sagging or drooping portions of articles conveyed by said rollers from impinging against the ends thereof, when passing from the rollers of one row onto the rollers of the other row, and means for driving said rollers.

3. In a conveying mechanism, a supporting structure comprising diverging side frame members and a longitudinally extending centrally disposed support, a plurality of load carrying rollers supported in said structure and arranged in two rows, the axes of the rollers of one of said rows being arranged obliquely to the axes of the rollers of the other of said rows, and the adjacent ends of the rollers of said rows being supported upon said center support in interdigitating relation, to thereby prevent sagging or drooping portions of articles conveyed by said rollers from impinging against the ends thereof, when passing from the rollers of one row onto the rollers of the other row.

ARCHIBALD D. EVANS.
HAROLD H. CLARK.